United States Patent [19]

Morikawa et al.

[11] Patent Number: 4,745,955

[45] Date of Patent: May 24, 1988

[54] PNEUMATIC TIRE FOR PASSENGER CAR

[75] Inventors: Tuneo Morikawa, Hadano; Shuji Takahashi, Hiratsuka, both of Japan

[73] Assignee: The Yokohama Rubber Co., Ltd., Tokyo, Japan

[21] Appl. No.: 867,841

[22] Filed: May 28, 1986

[51] Int. Cl.[4] ............................. B60C 9/04; B60C 9/18
[52] U.S. Cl. .................................. 152/527; 152/451; 152/548; 152/556
[58] Field of Search ............... 152/451, 527, 548, 556, 152/559, 526, 531; 57/902

[56] References Cited

U.S. PATENT DOCUMENTS 3,929,180  12/1975  Kawase et al. ..................... 152/556

FOREIGN PATENT DOCUMENTS

| 59-76914 | 5/1984 | Japan . | |
|---|---|---|---|
| 59-87140 | 5/1984 | Japan . | |
| 59-89203 | 5/1984 | Japan | 152/556 |
| 59-89204 | 5/1984 | Japan | 152/451 |
| 61-113852 | 5/1986 | Japan | 152/548 |
| 61-129303 | 6/1986 | Japan | 152/548 |

Primary Examiner—Donald E. Czaja
Assistant Examiner—Ramon R. Hoch
Attorney, Agent, or Firm—Armstrong, Nikaido, Marmelstein & Kubovcik

[57] ABSTRACT

A pneumatic tire for a passenger car, wherein a carcass layer consists of two layers, cords of nylon 46 fiber are used as the carcass cords of each of these layers, and the cords of one of the layers cross those of the other layer at an angle of from 5° to 40°. A pneumatic tire for a passenger car, wherein a belt cover layer is disposed on a belt layer and cords of nylon 46 fiber is disposed as the cords of the belt cover layer on the belt layer.

3 Claims, 6 Drawing Sheets

PNEUMATIC TIRE FOR PASSENGER CAR

BACKGROUND OF THE INVENTION

This invention relates to a pneumatic tire for a passenger car which has an improved high speed durability without deteriorating its uniformity (UF) and moreover an improved producibility.

With recent development in highway networks and in higher car performance, requirements for higher tire performance and diversification are ever growing. For example, HR tires capable of higher running than SR tires and VR tires capable of higher running than the HR tires have been required.

It has been a usual practice to dispose a belt cover layer on a belt layer in order to improve high speed performance of tires. In conventional tires provided with such a belt cover layer, however, a so-called "post-cure inflation (PCI)" step has been necessary. This step comprises charging a tire with air to a pressure higher than a normal internal pressure after it is taken out of a mold in a vulcanization step and discharging the air after the tire temperature has dropped to a sufficiently low level in order to control the size of the tire. For this reason, producibility of the tire has been extremely low.

SUMMARY OF THE INVENTION

An object of the present invention is to provide a pneumatic tire for a passenger car which has an improved uniformity as well as high speed durability without providing any belt cover layer and also an improved producibility.

It is another object of the present invention to provide a pneumatic tire for a passenger car which can dispense with the PCI step in spite of provision of a belt cover layer, thus enhancing the producibility, and which has an improved high speed durability.

The gist of the present invention resides in a pneumatic tire for a passenger car having a carcass layer, wherein the carcass layer has a double-layer structure, cords of nylon 46 fibers are used for each of these layers of the carcass layer, and the cords of one layer cross those of the other at an angle in the range of from 5° to 40°.

The further gist of the present invention resides in a pneumatic tire for a passenger car, wherein a belt cover layer is disposed on a belt layer, and nylon 46 fibers are used as the cords of the belt cover layer.

These and other objects and features of the present invention will become more apparent from the following description when taken in conjunction with the accompanying drawings.

DESCRIPTION OF THE PREFERRED EMBODIMENTS

Figure 4:
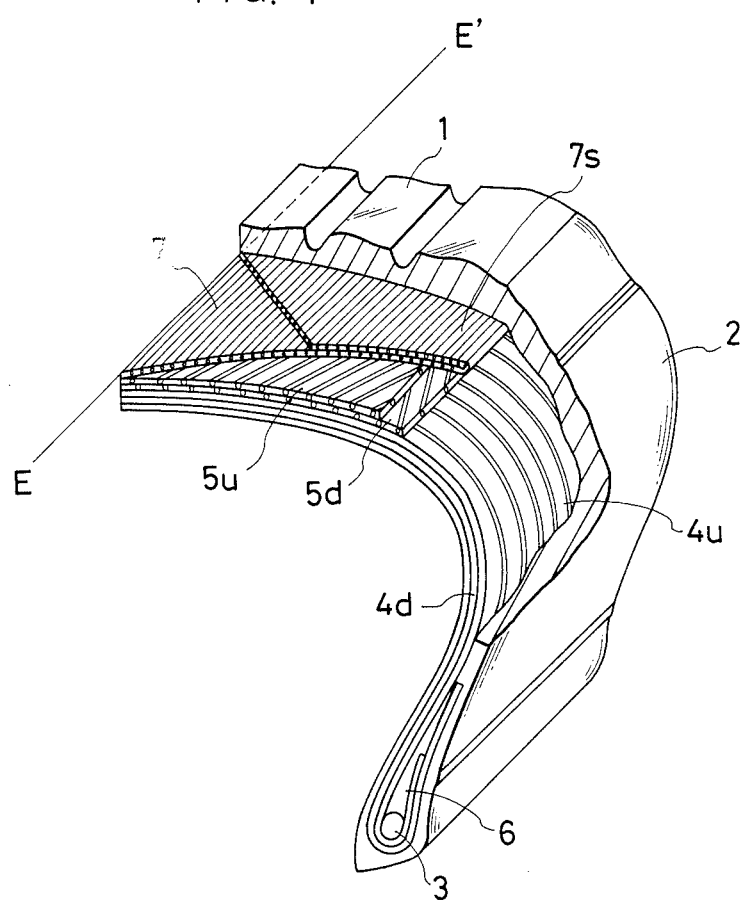
FIG. 4 is a partial cut-away semi-sectional perspective view of a pneumatic tire for a passenger car in accordance with another embodiment of the present invention.
Figure 5:
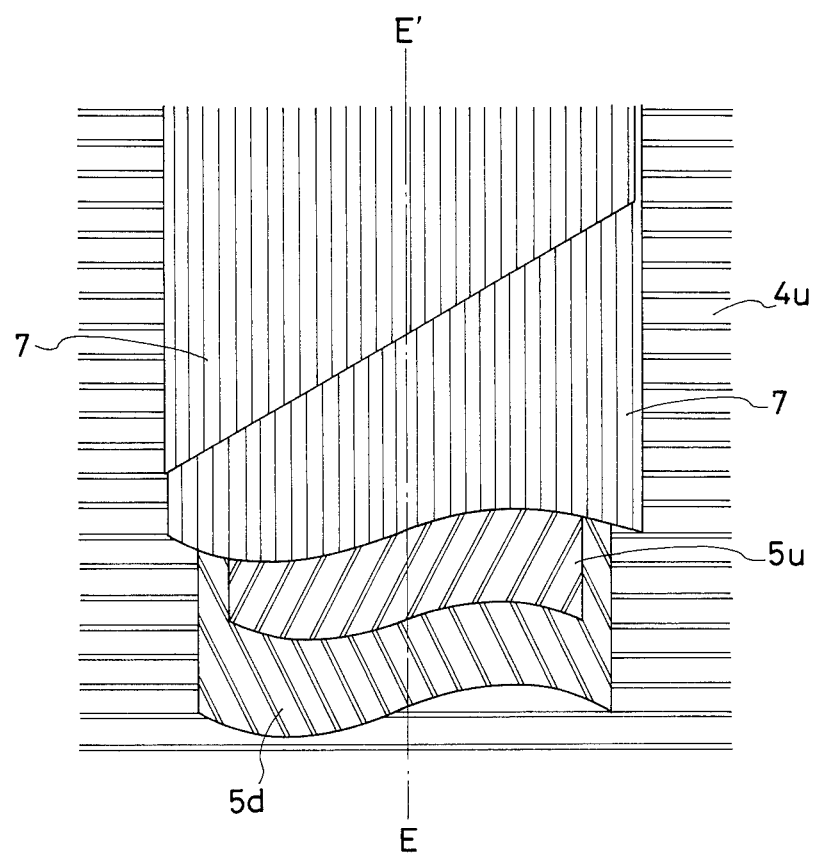
FIG. 5 is an exploded plan view of the belt layer and the belt cover layer of FIG. 4.

Conventionally, a carcass layer (composed of an upper carcass layer $4u$ and a lower carcass layer $4d$) is fitted between a pair of right and left bead wires 3, with the cord angle of the carcass layer being substantially at 90° relative to the circumferential direction $EE'$ of a tire, and a belt layer composed of an upper belt layer $5u$ and a lower belt layer $5d$ is disposed on the upper carcass layer $4u$ at a tread 1, as shown in FIGS. 4 and 5. Furthermore, a belt cover layer 7 is disposed on the upper belt layer $5u$. In FIG. 4, reference numeral 2 represents sidewalls, 6 is a bead filler and $7s$ is a splice portion of the belt cover layer 7.

The belt cover layer 7 serves to reinforce the belt layer, to prevent the latter from swelling up during high speed running and to improve rigidity in the circumferential direction of the tire in cooperation with the belt layer. Textile cords made of heat-shrinkable materials such as nylon, polyester and the like, are generally used as the cords of this belt cover layer 7 and the cords are disposed at substantially 0° relative to the circumferential direction $EE'$ of the tire (in parallel with $EE'$). For this reason, the post-cure inflation (PCI) step for maintaining the internal pressure immediately after vulcanization has been indispensable.

However, since the outer periphery of a green tire before vulcanization is molded to be smaller than the inner periphery of a vulcanization mold, the tire provided with the belt cover layer 7 is lifted during vulcanization and abnormal deformation develops around the splice portion $7s$ (such as reduction in the width of the belt cover layer 7 in the vicinity of the splice portion $7s$ as compared to the other portions), so that uniformity on the tire circumference is greatly affected, as is well known in the art. Such a non-uniformity of the tire circumference will result in vibration of a car body during high speed running and also in the drop of the high speed durability of the tire. This can be evidenced by a field test on high speed durability whereby the portion of the tire near the splice portion $7s$ is worn out abnormally rapidly, and an indoor test whereby peeling occurs almost invariably from the slice portion $7s$.

Another attempt has been made to improve the high speed durability by disposing the cords of the belt cover layer 7 at a certain angle with the circumferential direction $EE'$ of the tire. Since, however, the textile cords used as the cords of the belt cover layer exhibits large heat-shrinkability and a large drop in modulus after vulcanization, the high speed durability cannot be improved sufficiently.

Figure 1:
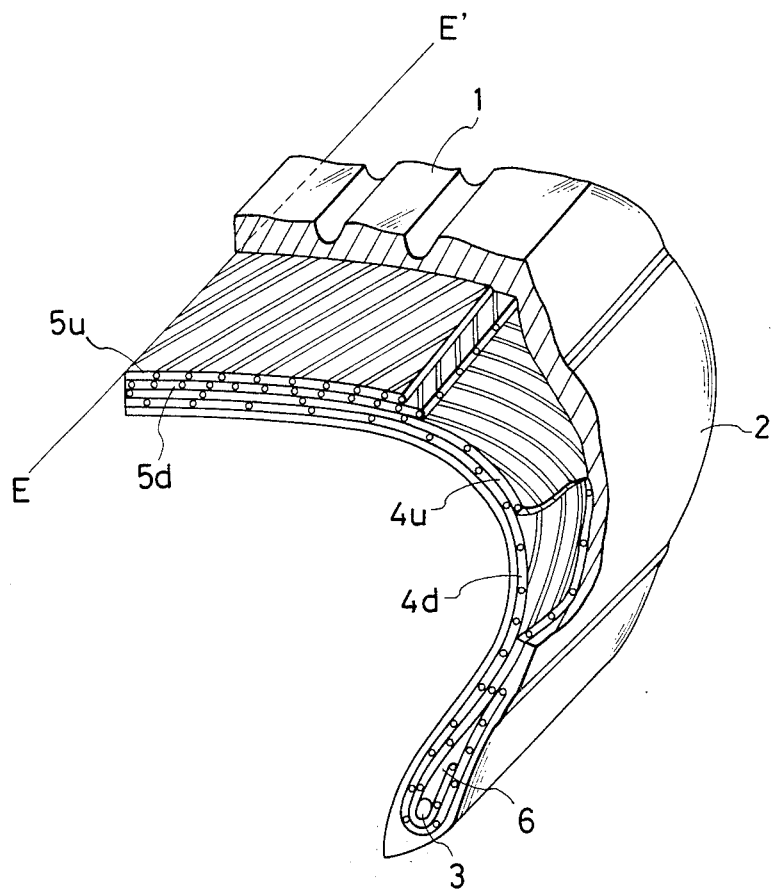
FIG. 1 is a partial cut-away semi-sectional perspective view of a pneumatic tire for a passenger car in accordance with one embodiment of the present invention.

A. Structurally, the pneumatic tire for a passenger car in accordance with the present invention is substantially the same as the one shown in FIG. 4 except that no belt cover layer 7 is disposed, as shown in FIG. 1. Although steel cords are primarily used as the cords of the belt layer, aromatic polyamide fiber cords or the like may also be used.

In the tire shown in FIG. 1, the present invention stipulates the following requirements (1) and (2).

(1) The carcass layer must have a double-layer structure and cords of nylon 46 fibers must be used as the carcass cord of each layer.

The term "nylon 46 fiber" refers to poly(tetramethyleneadipamide) fiber, which has a repeating unit of a molecular chain as illustrated below. The fiber is produced by polymerizing tetramethylenediamine with adipic acid, melt-spinning the polymer under a given condition and heat-stretching the obtained yarn. This fiber has a melting point of as high as about 300° C. and its glass transition point, 80° to 84° C., is by far higher than those of the conventional nylon 6 and nylon 66 fibers.

Prior to the use as the cord of the carcass layer, this fiber cord is subjected to bonding heat-treatment in order to improve its bonding power to a matrix rubber. This bonding heat-treatment is conducted for example, by coating the cord surface with RFL (a mixture of resorcinol/formalin precondensate and rubber latex) followed by heating.

This nylon 46 fiber cord has a tensile strength of at least 7.5 g/d, an initial modulus of at least 25 g/d and a dry heat shrinkage ratio at 150° C. of up to 3.0%. In addition, a twist coefficient K expressed by the formula below is within the range of from 1,000 to 2,500:

$$K = T\sqrt{D}$$

where
T: number of turns per 10 cm of cord,
D: total denier of cord.

If the twist coefficient K is below 1,000, the cords are poorly bundled and fatigue resistance drops below a practical level. On the other hand, if the twist coefficient K exceeds 2,500, the initial modulus drops and the cord becomes unsuitably particularly as the carcass cord for radial tires.

The modulus of the nylon 46 fiber at high temperature is by about 20% greater than that of nylon 66 fiber. Therefore, when the nylon 46 fiber cord is used as the carcass cord, it becomes possible to enjoy good casing rigidity even when the tire generates heat during running. Moreover, since the heat shrinkage ratio is small, the post-cure inflation step immediately after vulcanization can be dispensed with.

The reason why the carcass layer must have a double-layer structure in the present invention consists in an improvement in maneuvering stability and fulfillment of the following requirement (2). (2) The cord of one of the carcass layers must cross that of the other carcass layer at an angle of from 5° to 40°.

Figure 2:
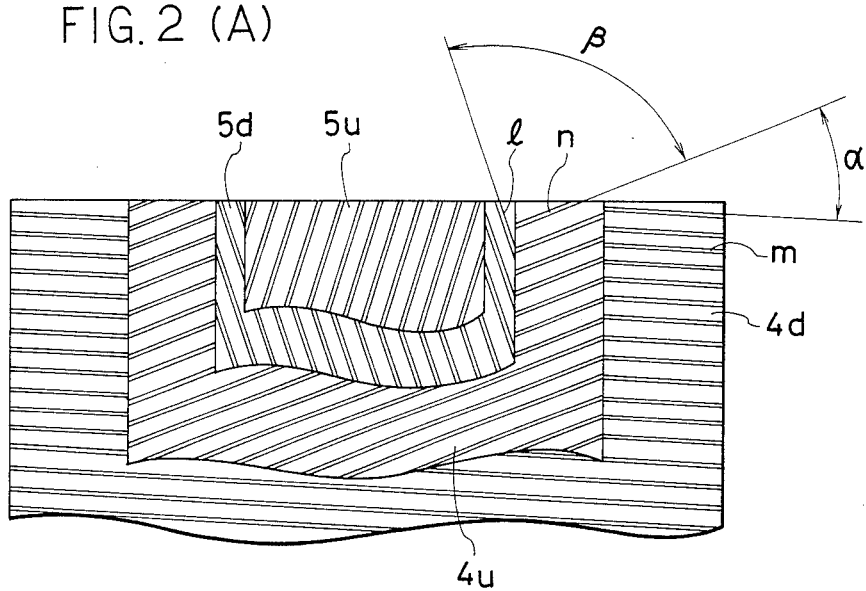
FIGS. 2(A) and 2(B) are exploded plan views of the carcass layer and the belt layer of FIG. 1, respectively.
Figure 2:
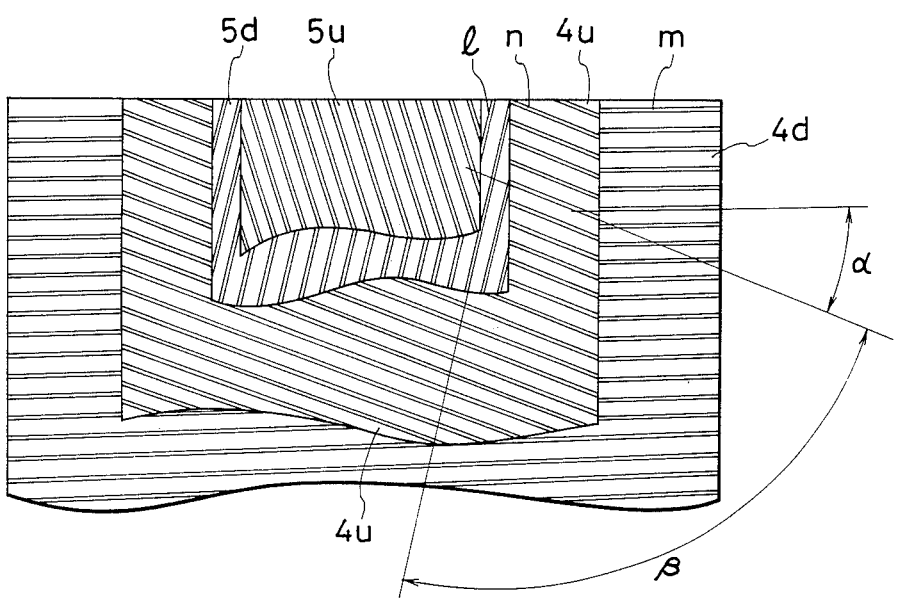

FIGS. 2(A) and 2(B) are exploded plan views of the carcass layer and the belt layer of FIG. 1, respectively. In these drawings, the crossing angle between cords m of the lower carcass layer 4d and cords n of the upper carcass layer 4u should be from 5° to 40°. This arrangement can impart restrictive force in the circumferential direction of the tire to the carcass layer and can improve the stability during high speed running.

It is particularly preferred that the crossing angle β between cords n of the upper carcass layer 4u and cords l of the lower belt layer 5d be 90°, because this arrangement can reduce the ply steer force among the uniformity characteristics of the tire. According to this crossing angle β, the cords l of the lower belt layer 5d extend rightwardly downward if the cords n of the upper carcass layer 4u extend leftwardly downward [FIG. 2(A)] and extend leftwardly downward if the cords n of the upper carcass layer 4u extend rightwardly downward [FIG. 2(A)].

In the conventional tires having a carcass layer whose cord angle with respect to the circumferential direction of the tire is substantially 90°, a large reinforcing effect can be obtained in the radial direction of the tire but no such an effect can be obtained substantially in the circumferential direction of the tire. For this reason, a belt cover layer as reinforcing means in the circumferential direction of the tire must be disposed as described already in HR tires or VR tires which can withstand relatively high speed running.

In contrast, in the tire of the present invention, the crossing angle of the carcass cords having an extremely high modulus at high temperatures is specified to be from 5° to 40° as described above, so that the carcass cords exhibit the reinforcing effect in both radial and circumferential directions of the tire. Therefore, the present invention can markedly improve the high speed durability.

B. Besides the requirements (1) and (2) described above, the present invention disposes a belt cover layer on the belt layer as shown in FIGS. 4 and 5, and nylon 46 fibers can be used as the cords of this belt cover layer.

Furthermore, the present invention disposes a belt cover layer on the belt layer as shown in FIGS. 4 and 5 without specifying the afore-mentioned requirements (1) and (2), and the nylon 46 fibers can be used as the cords of this belt cover layer.

Now the effects of the present invention will be described in more detail with reference to experimental examples thereof.

EXPERIMENTAL EXAMPLE 1

Samples of the tire of the present invention, a conventional tire and a comparative tire were produced, and their uniformity and high speed durability were evaluated.

The tire size was 185/70 HR 13, the belt layer was composed of steel 1×5 (0.25) 40 ends crossing one another at an angle of 20° and only the conventional tire was provided with a belt cover layer of nylon 840 d/2 58 ends. The "end" refers to the number of pieces per 50 mm measured at right angles to the cord direction on an equatorial plane of the tire for all of the tires.

(a) Tire of this invention:
The carcass layer had a double-layer structure composed of nylon 46, 840d/2, 35 ends, crossing angle 30° and crossing one another but without PCI treatment.

(b) Conventional tire:
The carcass layer had a double-layer structure composed of polyester, 1000d/2, 35 ends, angle 90° (crossing angle: 0°) with PCI treatment.

(c) Comparative tire:
The carcass layer had a double-layer structure composed of nylon 66, 840d/2, 35 ends, angle 30° and crossing one another with PCI treatment.

Tire Uniformity

These samples were tested in accordance with a uniformity test method for car tires (JASO C607).

Figure 3:
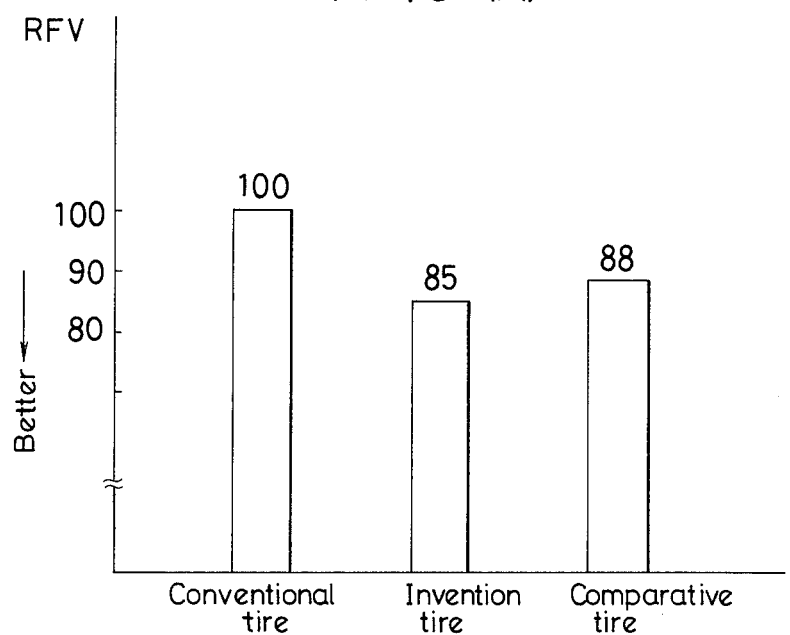
FIG. 3(A) is a diagram showing the relation between a sample tire and tire uniformity.
FIGS. 3(B) and 3(C) are diagrams, each showing the relation between the sample tire and high speed durability.
Figure 3:
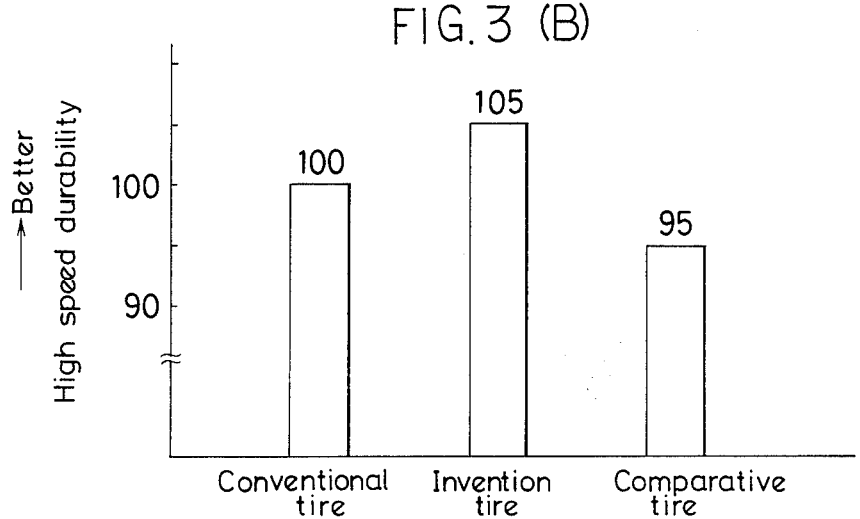
Figure 3:
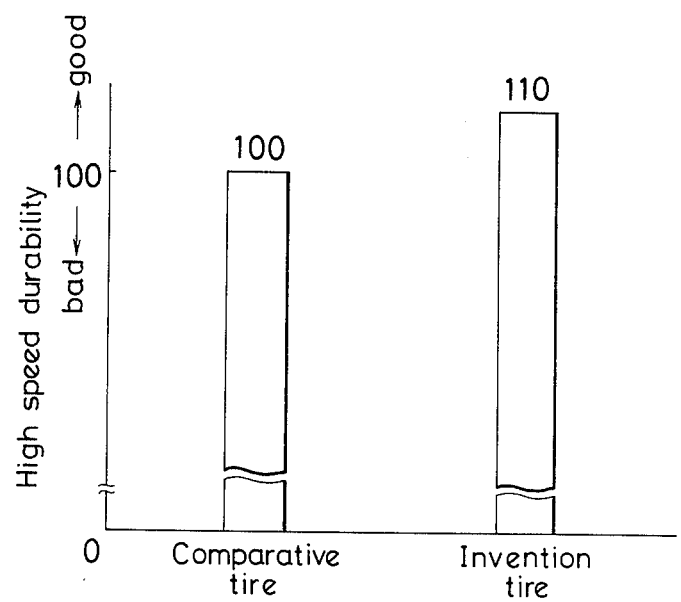

The results are shown by an index in terms of radial force variation (RFV) in FIG. 3(A). The smaller the value, the better.

It can be understood from FIG. 3(A) that RFV is smaller in the tire of the present invention than in the conventional tire and the comparative tire.

High Speed Durability

Each tire was subjected to a high speed durability test by use of an indoor drum tester (drum diameter: 1,707 mm), under the following conditions:
rim used: 5J×13,
internal pressure p: 3.0 kg/cm$^2$,
load W: 450 kg.

Each tire was run until it got broken while the running speed was increased starting from 170 kg/hr at a rate of 10 km/hr per every 10 minutes.

The results are shown by an index in FIG. 3(B). The greater the value, the better.

It can be understood from FIG. 3(B) that the tire of the present invention has a far improved high speed durability when compared with the conventional tire and the comparative tire.

EXPERIMENTAL EXAMPLE 2

Samples of the tire of the present invention and a comparative tire, each having the following specification, were produced and their high speed durability was evaluated in the same way as in Experimental Example 1.

The tire size was 195/70 HR 14. Polyester fiber cords 1,500d/2 were used as the cords of the carcass layer and two sheets of steel cords 1×5 (0.25) were used with an end count of 40/5 cm were used as the belt layer.

(d) Tire of this invention:
Structure as shown in FIGS. 4 and 5.
belt cover layer: one 50 ends/5 cm.
cord of belt cover layer: one obtained by giving first twist to raw yarns of nylon 46 fibers of 1,260 deniers, combining two twisted yarns together, giving second twist thereto to obtain a cord (1260d/2), coating the cord with RFL, and heat-treating the cord at 230° C.

(e) Comparative tire:
Structure as shown in FIGS. 4 and 5.
belt cover layer: one, 50 ends/5 cm.
cord of belt cover layer: one obtained by twisting nylon 66 fibers (1260d/2) in the same way as described above to obtain a cord, and subjecting the resulting cord to bonding treatment.

The test results are shown in FIG. 3(C) by an index. The greater the value, the better.

It can be understood from FIG. 3(C) that high speed durability is improved by 10% in the tire of the present invention as compared with the comparative tire.

As described above, in pneumatic tires having a carcass layer, the present invention specifies the afore-mentioned requirements (1) and (2), and hence the belt cover layer need not be disposed on the belt layer. Consequently, tire uniformity is not deteriorated and high speed durability as well as producibility can be improved sufficiently. Moreover, since the PCI step can be omitted, producibility can be remarkably enhanced.

In accordance with the present invention, when the belt cover layer is disposed on the belt layer, cords of the nylon 46 fiber are used as the cords of the carcass layer, so that the PCI step can be dispensed with and high speed durability can be further improved.

What is claimed is:

1. A pneumatic tire for a passenger car having a belt cover layer disposed on a belt layer, cords used in said belt cover layer comprising nylon 46 fiber cords having a tensile strength of at least 7.5 g/d, an initial modulus of at least 25 g/d, a dry heat shrinkage ratio at 150° C. of up to 3.0% and a twist coefficient K, represented by the following formula, within a range of from 1,000 to 2,500:

$$K = T\sqrt{D}$$

where
T: number of turns per 10 cm of cords,
D: total denier of cords.

2. A pneumatic tire for a passenger car having a carcass layer of a double-layer structure, cords used for the carcass cords comprising nylon 46 fiber cords having a tensile strength of at least 7.5 g/d, an initial modulus of at least 25 g/d, a dry heat shrinkage ratio at 150° C. of up to 3.0% and a twist coefficient K, expressed by the following formula within a range of 1,000 to 2,500; cords of one of the layers and those of the other layer being crossed with one another at an angle of from 5° to 40°:

$$K = T\sqrt{D}$$

wherein
T: number of turns per 10 cm of cords,
D: total denier of cords.

3. A pneumatic tire for a passenger car according to claim 2, wherein the crossing angle β between the cords of an upper carcass layer adjacent to a belt layer and those of said belt layer is from 75° to 90°.

* * * * *